US012782190B2

(12) United States Patent
D'Orazio et al.

(10) Patent No.: US 12,782,190 B2
(45) Date of Patent: Nov. 3, 2026

(54) BLAST SENSOR PERFORMANCE IMPROVEMENT

(71) Applicant: Blackbox Biometrics, Inc., Rochester, NY (US)

(72) Inventors: Angela D'Orazio, Rochester, NY (US); David A. Borkholder, Rochester, NY (US)

(73) Assignee: Blackbox Biometrics, Inc., Rochester, NY (US)

( * ) Notice: Subject to any disclaimer, the term of this patent is extended or adjusted under 35 U.S.C. 154(b) by 211 days.

(21) Appl. No.: 18/569,396

(22) PCT Filed: Jun. 24, 2022

(86) PCT No.: PCT/US2022/034954
§ 371 (c)(1),
(2) Date: Dec. 12, 2023

(87) PCT Pub. No.: WO2022/272099
PCT Pub. Date: Dec. 29, 2022

(65) Prior Publication Data
US 2024/0271991 A1 Aug. 15, 2024

Related U.S. Application Data

(60) Provisional application No. 63/241,890, filed on Sep. 8, 2021.

(51) Int. Cl.
*G01H 3/12* (2006.01)
*G02B 5/00* (2006.01)

(52) U.S. Cl.
CPC ............... *G01H 3/12* (2013.01); *G02B 5/003* (2013.01)

(58) Field of Classification Search
None
See application file for complete search history.

(56) References Cited

U.S. PATENT DOCUMENTS 3,281,811 A 10/1966 William et al.
4,576,181 A * 3/1986 Wallace ............... A61B 5/0215 600/561

(Continued)

FOREIGN PATENT DOCUMENTS

JP S6251765 U * 3/1987
JP H04116435 A * 4/1992

OTHER PUBLICATIONS

"International Application Serial No. PCT/US2022/034954, International Search Report mailed Oct. 19, 2022", 4 pgs.

(Continued)

*Primary Examiner* — Daniel S Larkin
(74) *Attorney, Agent, or Firm* — Nelson Mullins Riley & Scarborough LLP

(57) ABSTRACT

Systems and methods to reduce light transmission to a sensing element of a blast sensor are disclosed, including a light attenuation material to cover at least a portion of the blast sensor to reduce false detection of impulse noise or shock wave events by the sensing element of the blast sensor. The light attenuation material can include a pigmented gel having a specific pigment concentration and thickness to reduce false detection of events while maintaining performance of detection of impulse noise or shock wave events.

20 Claims, 7 Drawing Sheets

(56) References Cited

U.S. PATENT DOCUMENTS

| | | | | | |
|---|---|---|---|---|---|
| 4,658,651 | A * | 4/1987 | Le | G01L 9/065 29/621.1 |
| 4,679,567 | A * | 7/1987 | Hanlon | G01L 19/0084 600/561 |
| 5,074,152 | A * | 12/1991 | Ellner | G01L 9/0054 73/766 |
| 12,000,747 | B2 † | 6/2024 | Willens | |
| 2010/0229784 | A1 | 9/2010 | Bayne et al. | |
| 2014/0116122 | A1 * | 5/2014 | Lammel | G01N 27/223 73/73 |
| 2016/0097756 | A1 * | 4/2016 | Borkholder | G01N 33/227 73/35.15 |
| 2018/0140233 | A1 | 5/2018 | Lacirignola et al. | |
| 2020/0200634 | A1 * | 6/2020 | Schiller | G01L 19/0645 |

OTHER PUBLICATIONS

"International Application Serial No. PCT/US2022/034954, Written Opinion mailed Oct. 19, 2022", 6 pgs.

Whittier, Robert M., Reducing Transient Thermal Sensitivity of Silicon Diaphragm Pressure Transducers, Eleventh Transducer Workshop, Seattle, WA, available Secretariat Range Commander's Council, White Sands Missile Range, NM, pp. 292-301, Jun. 2-4, 1981.†

Walter, Patrick L., PhD, Introduction to Air Blast Measurements—Part V: Alternate Technologies?, Technical Note TN-22, PCB Piezoelectronics, Inc., www.pcb.com, copyright 2006.†

Hilton, John S. et al., NBS Technical Note 961, Experimental Investigation of Means for Reducing the Response of Pressure Transducers to Thermal Transients, U.S. Department of Commerce, National Bureau of Standards, Jan. 1978.†

Kyowa Catalog May 2014.†

Hurst Adam M., et al., An Experimental Frequency Response Characterization of MEMS Piezoresistive Pressure Transducers, Proceedings of ASME Turbo Expo 2014, Jun. 16-20, 2014 Dusseldorf, Germany, Citation GT2014-27159.†

Kyowa Dam Measurement Catalog copyright 2014 and data sheet for BPC-A pressure sensor shown in catalog.†

Archived Web pages dated Feb. 1, 2004, and Oct. 21, 2015 for company Merit Sensor showing product SMD Series pressure sensors that include opaque gel surrounding and or covering part of the sensor.†

* cited by examiner
† cited by third party

BLAST SENSOR PERFORMANCE IMPROVEMENT

CLAIM OF PRIORITY

This application is a U.S. National Stage Filing under 35 U.S.C. 371 from International Patent Application Serial No. PCT/US2022/034954, filed Jun. 24, 2022, published on Dec. 29, 2022, as WO2022/272099, which application claims the benefit of priority under 35 U.S.C. § 119(e) of U.S. Provisional Patent Application Ser. No. 63/214,890, filed on Jun. 25, 2021, both of which are herein incorporated by reference in their entireties.

BACKGROUND

Unwanted or excessive sound can have deleterious effects on human health. Sounds having sound pressure levels (SPLs) above 85 decibels (dB) for extended periods of time can damage structures of the inner ear, leading to noise-induced hearing loss (NIHL). The Occupational Safety and Health Administration (OSHA) requires the employers implement hearing conservation programs when noise exposure is at or above 85 decibels averaged over 8 working hours, or an 8-hour time-weighted average (TWA). Exposure to sound events at more than 105 dB average (dBA) can cause some amount of permanent hearing loss.

Exposure to impulse events, such as blast exposure, can produce high intensity overexposures, often referred to as blast overpressure (BOP), which can pose both a risk of NIHL and a risk of traumatic brain injury (TBI) with one or more cumulative exposures. Impulse events include impulse noise events, such as gunshots, explosions, or other sound events having fast initial rise times, such as 50 μs or less (e.g., frequencies of 20 kHz or higher), often with SPLs above 140 dB (depending on distance from the event).

Blast sensors configured to detect impulse noise or shock wave events often include one or more pressure, acoustic, or other sensors open to or facing the external environment, including, at times, direct sunlight and changing atmospheric conditions. Changes in lighting conditions can impact sensor performance, including, in certain examples, photovoltaic events causing false detection of pressure events, including impulse events or blast exposure. Accordingly, there is a need to reduce external environmental noise from blast sensors in a way that minimally impacts blast sensor performance.

SUMMARY

Systems and methods to reduce light transmission to a sensing element of a blast sensor are disclosed, including a light attenuation material to cover at least a portion of the blast sensor to reduce false detection of impulse noise or shock wave events by the sensing element of the blast sensor. The light attenuation material can include a pigmented gel having a specific pigment concentration and thickness to reduce false detection of events while maintaining performance of detection of impulse noise or shock wave events.

This summary is intended to provide an overview of subject matter of the present patent application. It is not intended to provide an exclusive or exhaustive explanation of the disclosure. The detailed description is included to provide further information about the present patent application. Other aspects of the disclosure will be apparent to persons skilled in the art upon reading and understanding the following detailed description and viewing the drawings that form a part thereof, each of which are not to be taken in a limiting sense.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Blast sensors can include one or more stationary or ambulatory sensors configured to detect and monitor exposure to impulse noise or shock wave events. Such sensors commonly include sensing elements having materials that are sensitive to sunlight or changes in sunlight, such as silicon, etc.

Figure 1:
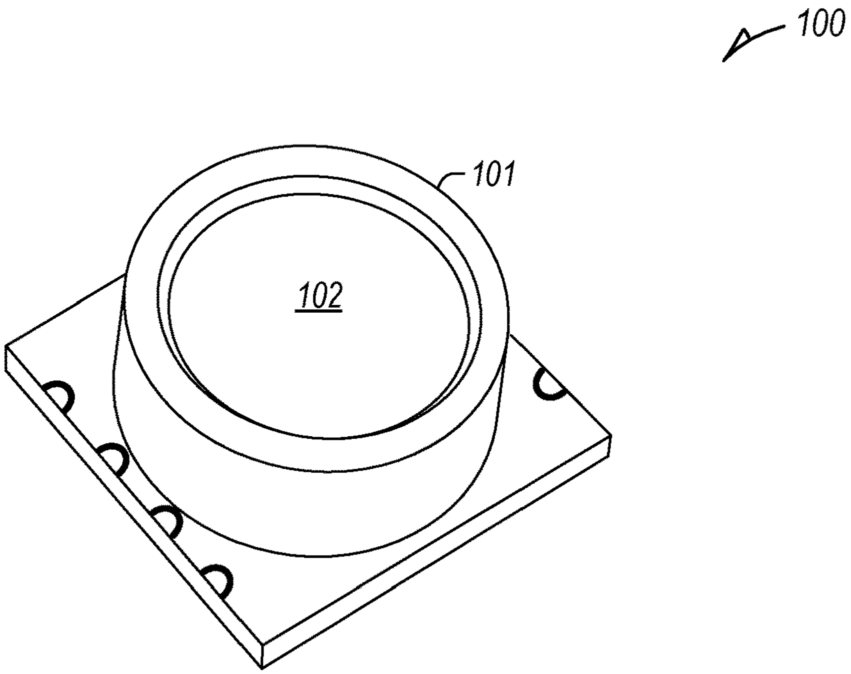
FIG. 1 PRIOR ART
FIGS. 1-2 illustrate prior art barometric and medical pressure modules.

FIG. 1 illustrates a prior art barometric pressure module 100 (TE Connectivity MS5540C) including a protection cap 101 surrounding a pressure sensor on a printed circuit board having a detection range between 10 and 1100 mbar (between approximately 0.15 PSI and approximately 16 PSI) and a response time of 35 ms. As barometric pressure changes do not change quickly, a fast response time is not required.

The protection cap 101 is filled with a relatively thick layer of white gel 102 (e.g., greater than 2 mm) to protect the pressure sensor against humidity, direct contact with water, and light. However, the white gel 102 transmits enough light to cause false readings, and thus, the barometric pressure module 100 may not be exposed to direct sunlight during operation. To avoid direct sunlight, the barometric pressure module 100 may be placed in mechanical parts with holes such that light is reflected, dispersed, or otherwise reduced before reaching the sensor.

In contrast, blast sensors are frequently exposed to changing ambient conditions, including direct sunlight, and must maintain direct or near-direct exposure to impulse noise or shock wave events and a wide detection bandwidth and to accurately detect, determine the intensity of, and distinguish impulse noise or shock wave events having high frequencies (e.g., 20 kHz or higher), fast rise times (e.g., 50 μs or less), often exceeding 140 DB or 200 PSI. In certain examples, placing the sensing element of a blast sensor at or proximate to an outer surface of a housing can improve sensor performance. Relying on mechanical features alone to reduce light events may negatively impact sensor accuracy or performance.

Blast sensors can include one or more pressure sensors, such as a microelectromechanical system (MEMS) pressure sensor configured to provide an electrical output (e.g., a Wheatstone bridge resistive sensor network, etc.) representative of a received mechanical pressure on a sensing element (e.g., a silicon etched diaphragm, etc.).

Changes in light, such as changing from covered to uncovered in partial or direct sun (e.g., sunlight events), exposure to a fireball from a blast, etc., may cause a false response by pressure sensors with sensing elements composed of material sensitive to light, such as silicon, due to, for example, a photovoltaic event by the sensing element. In certain examples, false detections can exceed 0.5 pound-force per square inch, disrupting aggregate time-weighted average exposure and exposure to impulse events.

Figure 2:
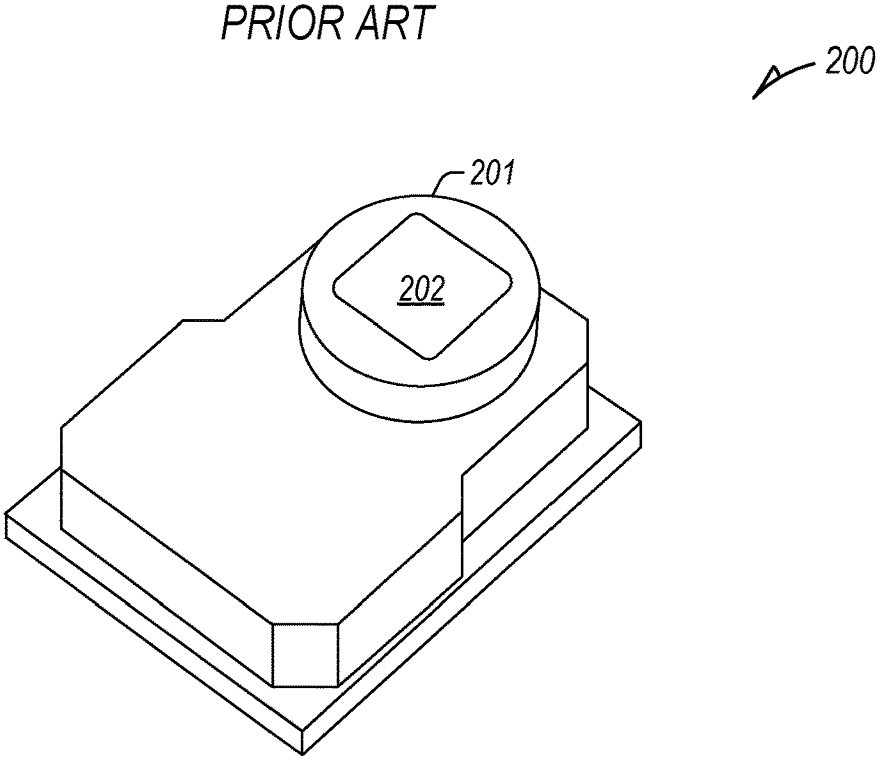
FIG. 2 PRIOR ART

FIG. 2 illustrates a prior art medical pressure module 200 in the medical arts (e.g., Amphenol NPC-100), including a pressure sensor, such as for medical instrumentation, blood pressure measurement, infusion pumps, and kidney dialysis machines, in a pressure port 201 having a relatively thick layer of pigmented gel 202 (e.g., 3 mm) to block light so as not to interfere with physiological pressure measurements, but as with the barometric pressure sensor 100 of FIG. 1, cannot achieve the necessary bandwidth or response time to achieve accurate blast sensing. For example, the NPC-100 sensor is designed for pressure ranges between −0.97 psi to 5.8 psi, with a light sensitivity of 1 mmHg (e.g., 0.02 psi).

The present inventors have recognized, among other things, a compact and power efficient blast sensor device having a wide detection bandwidth configured for wearable use in a variety of environments, including by warfighters in variety of extreme conditions, having a pigment concentration and gel thickness over the sensing element to effectively eliminate false alarms due to light events, the gel thickness and pigment concentration having an inverse functional relationship to reject light events without reducing blast sensing performance to impulse noise or shock wave events.

Figure 3:
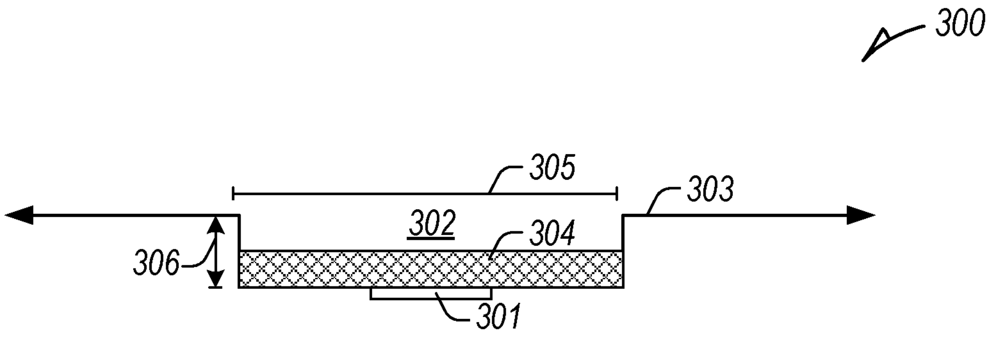
FIGS. 3-4 illustrate example blast sensor systems.

FIG. 3 illustrates an example blast sensor system 300 including a pressure sensor 301 configured to detect impulse noise or shock wave events from an opening 302 in an upper surface 303, such as an outer surface of a housing, a test probe, etc. The pressure sensor 301 can include a sensing element (e.g., a diaphragm, etc.) composed of a material sensitive to light or changes in light (e.g., silicon, etc.). In an example, the pressure sensor 301 can include a silicon-based piezoresistive pressure sensor.

The pressure sensor 301 can be located proximate the upper surface 303. For example, in FIG. 3, a top of the pressure sensor 301, having the sensing element, can be less than 1 mm below the upper surface 303. In FIG. 3, the opening 302 has a depth 306 of 0.9 mm. The depth 306 can be similar to one dimension (e.g., a length, a width, etc.) of the pressure sensor 301.

At least a portion of the pressure sensor 301 can be covered by a light attenuation material 304 to reduce light transmission to the sensing element of the pressure sensor 301 to reduce false detection of impulse noise or shock wave events from changes in light by the blast sensor while maintaining detection bandwidth of the blast sensor 301.

In an example, the light attenuation material 304 can include a mixture of a gel and a pigment (e.g., a pigmented gel) covering some or all of the pressure sensor 301. The gel can include a nonfluid colloidal network or polymer network expanded throughout its volume by a fluid, such as a silicone gel, etc. In an example, the pigment can include either carbon black or copper chromite black including particles (e.g., carbon or copper chromite particles, etc.) that scatter and reflect light, reduce solar absorbance, temperature, and radiation transmittance of the gel.

The optical density can be increased by increasing the concentration of the pigment in the gel or by increasing the thickness of the mixture over the sensing element. In general, the goal is to use as little pigment and gel as possible to achieve light protection and avoid false detection of impulse noise or shock wave events while maintaining sensing bandwidth and performance of the sensing element of the blast sensor. In an example, to maintain performance and bandwidth of the sensing element of the pressure sensor 301, the gel can have a thickness of 2 mm or less.

In a first example, the pigmented gel can have a thickness of approximately 0.25 mm (e.g., +10%, etc.) over the sensing element of the pressure sensor 301 with a concentration of 40 parts gel to approximately 6 parts pigment (e.g., as little as 4 parts pigment were shown to significantly reduce light events over 0.5 PSI, and 5 parts pigment, as well as 6, effectively eliminated light events over 0.5 PSI) (e.g., 5 to 7 parts pigment, etc.). As the thickness of the light attenuation material 304 is reduced, the pigment concentration generally increases to maintain the desired light protection. For example, if the pigmented gel has half the thickness of the first example at approximately 0.125 mm (e.g., ±20%, etc.) over the sensing element, the concentration of pigment increases by roughly double, with a concentration of 40 parts gel to approximately 12 parts pigment (e.g., 10 to 12 parts pigment, 10 to 14 parts pigment, etc.). If the pigmented gel has double the thickness of the first example at approximately 0.5 mm (e.g., +5%, etc.) over the sensing element, the concentration of the pigment decreases by roughly half, with a concentration of 40 parts gel to approximately 3 parts pigment (e.g., 3 to 5 parts pigment, 2 to 5 parts pigment, etc.). The concentrations illustrated above are illustrative, and in other examples, other concentrations can be used, consistent with the teachings herein. An increase in gel thickness reduces sensor performance and bandwidth. A decrease in gel thickness reduces protection of the sensor to environmental conditions.

Figure 4:
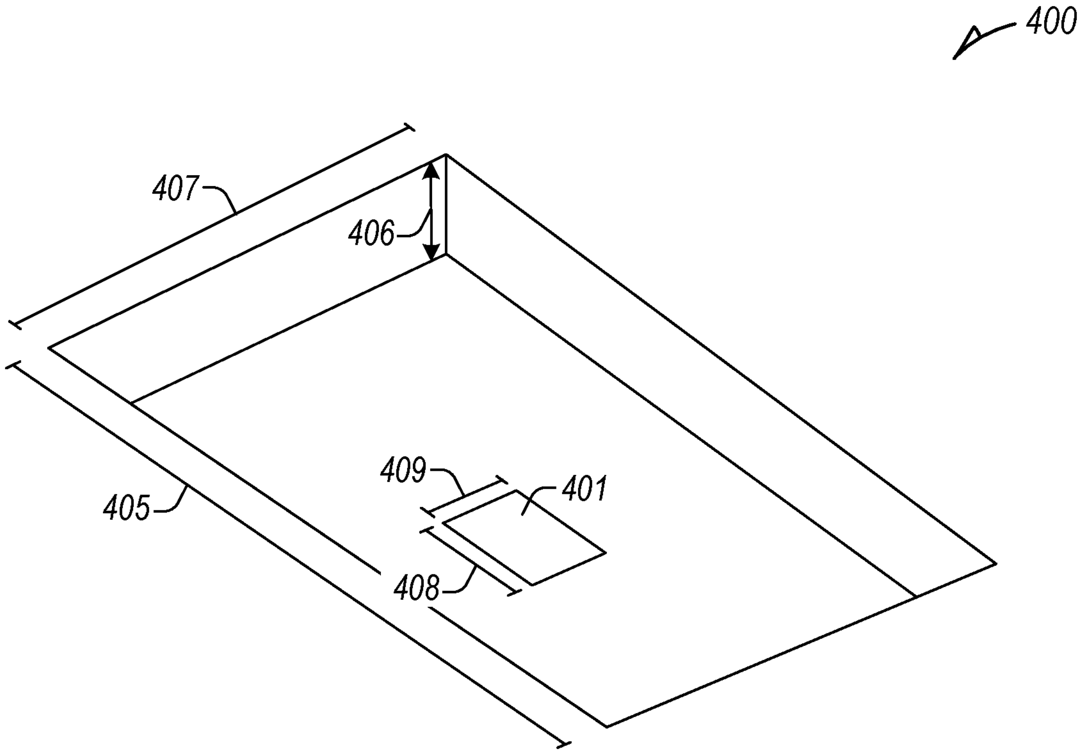

FIG. 4 illustrates an example blast sensor system 400 including a pressure sensor 401 configured to detect impulse noise or shock wave events from an opening of an upper surface, such as an outer surface of a housing, a test probe, etc. In certain examples, the opening can be a cavity in the outer surface, etc.

In certain examples, the pressure sensor 401 can have a length 409 and width 408 of relatively small size (e.g., 1 mm×1 mm, etc.), with a surface (e.g., a top surface) flush or approximately flush with a bottom of the opening, having a relatively shallow depth 406 (e.g., 0.9 mm) and a length 405 and width 407 each greater than the depth 406. For example, the length 405 can be 3.3 mm and the width 407 can be 2.6 mm. In other examples, one or more of the opening or the pressure sensor 401 can have other sizes or dimensions.

In other examples, the pressure sensor 401 can be located at the upper surface, covered by the light attenuation material, such as in a rain drop configuration (without the opening of FIGS. 3 and 4). In certain examples, the light attenuation material can be restricted to covering the sensing element of the pressure sensor 401.

Figure 5:
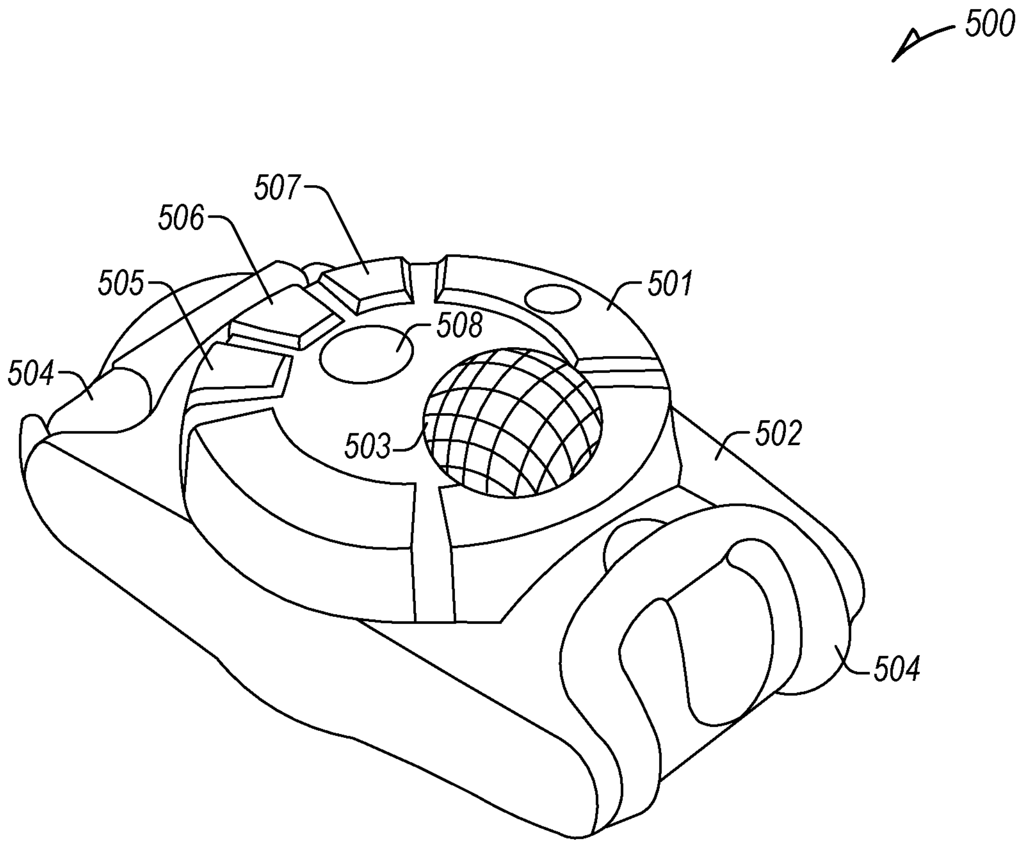
FIGS. 5-6 illustrate an example blast sensor systems.

FIG. 5 illustrates a perspective view of an example blast sensor system 500 having a top surface 501 and a body portion 502 (e.g., an impact resistant casing, etc.), and a sensor dome 503 of mesh material over a pressure sensor to reduce dirt and debris collection over the pressure sensor.

The example blast sensor systems 500 includes a button 508, and different first, second, and third indicators 505, 506, 507. An attachment cord 504 (e.g., a bungee, etc.) can attach the blast sensor system 500 to one or more objects or attachment points using different mechanical grooves and protrusions.

Figure 6:
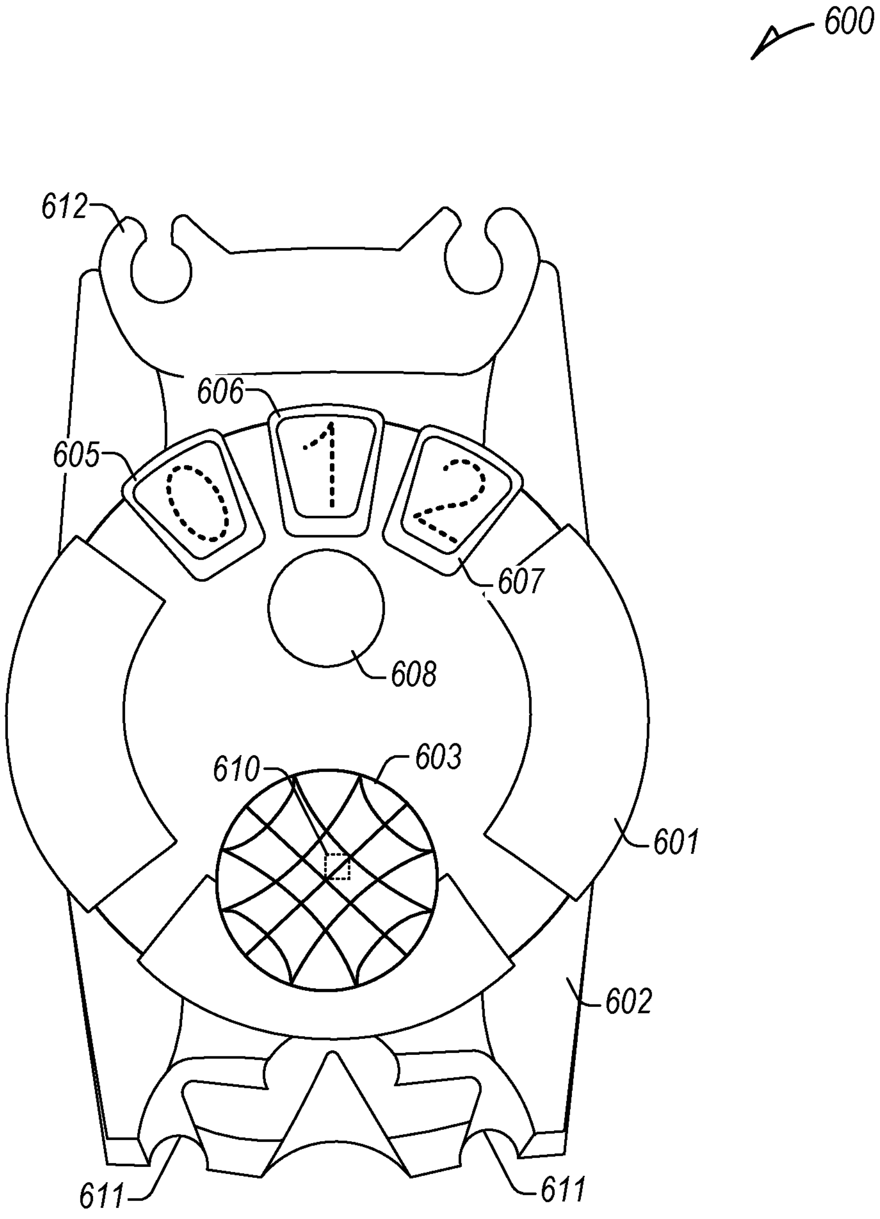

FIG. 6 illustrates a top view of an example blast sensor system 600 having a top surface 601 and a body portion 602 (e.g., an impact resistant casing, etc.), and a sensor dome 603 of mesh material over a sensing element 610, such as a pressure sensor described herein, to reduce dirt and debris collection over the pressure sensor. The example blast sensor system includes a button 608, different first, second, and third indicators 605, 606, 607. Examples of the mechanical grooves and protrusions reference in the description of FIG. 5 are illustrated as mechanical grooves 611 and protrusions 612.

The example blast sensor systems described herein have been tested in various configurations with different events, such as via shock tube and cylindrical test charges. Different pigment concentration were evaluated against a standard sensor positioned in various configurations with respect to the different events. For example, a shock tube (e.g., a 0.001" Thick Mylar sheet burst at ~165 psi) was placed in front of different sensor configurations, normal to and separately perpendicular to the upper surface of a sensing element. In other examples, a test charge was delivered, both normal to and separately perpendicular to the upper surface of the sensing element. Different gel pigment concentrations (e.g., standard, light, and dark) were tested without significant deviation in detected peak overpressure in PSI. Light testing was performed outdoors using a rotating physical barrier to provide alternating periods of blocked and direct sunlight for different gel pigment concentrations. Pigment concentrations of 5 parts pigment to 40 parts gel at approximately 0.25 mm gel thickness were shown to effectively eliminate light events without negatively impacting blast sensing performance.

Figure 7:
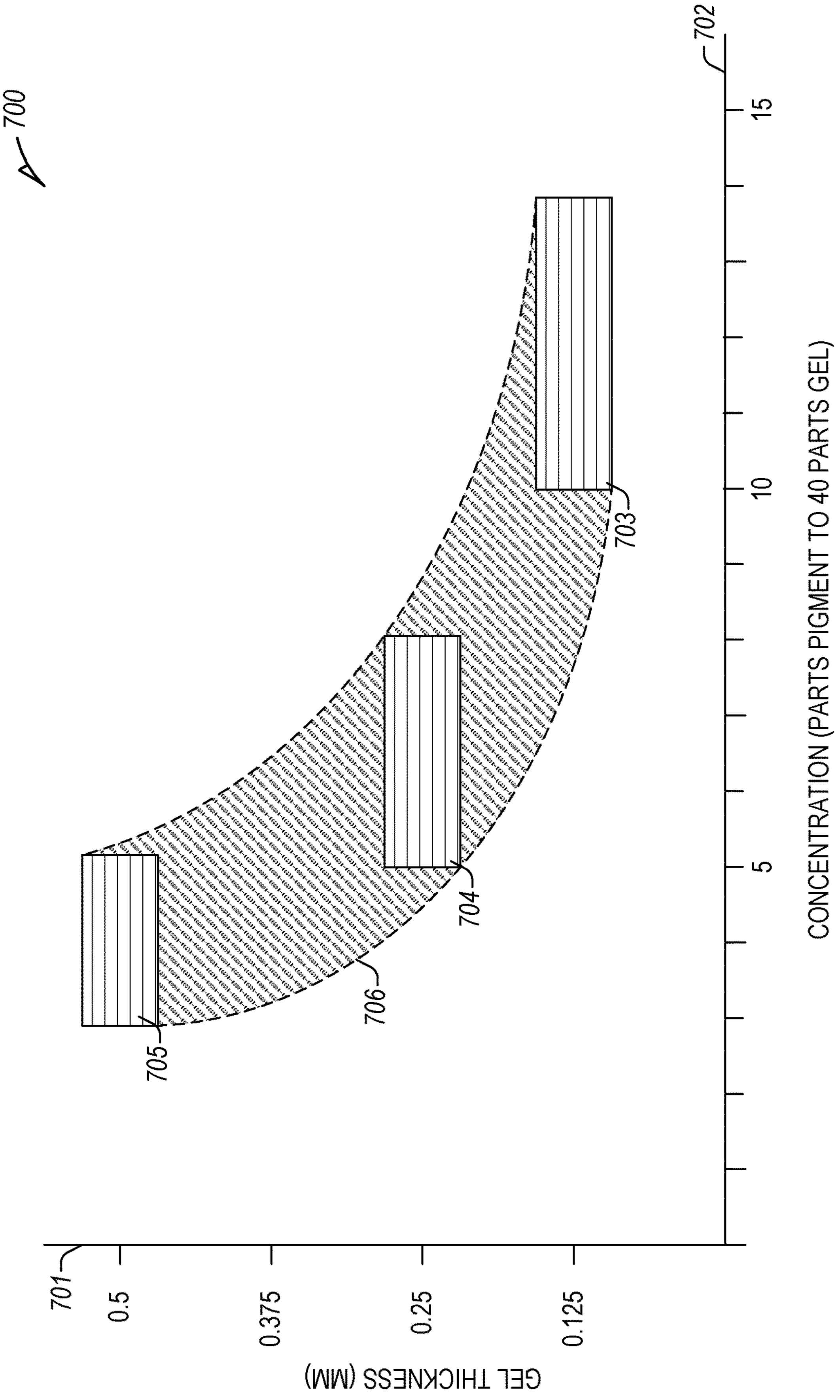
FIG. 7 illustrates an example relationship between gel thickness and pigment concentration.

FIG. 7 illustrates an example relationship 700 between gel thickness 701 (in mm) and pigment concentration 702 (in parts pigment per 40 parts gel) to reduce false detection of impulse noise or shock wave events from changes in light by the sensing element of the blast sensor, such as discussed herein. The first, second, and third boxes 703, 704, 705 illustrate the effective ranges discussed herein about each example gel thickness (e.g., 0.125 mm, 0.25 mm, 0.5 mm, plus and minus respective percentages, etc.) with respect to pigment concentrations. The area 706 illustrates example ranges for different thicknesses in accordance with such examples described herein. In certain examples, the boundaries of the area 706 can be expanded to cover different thicknesses, such as above 0.525 mm or below 0.1 mm, etc.

Figure 8:
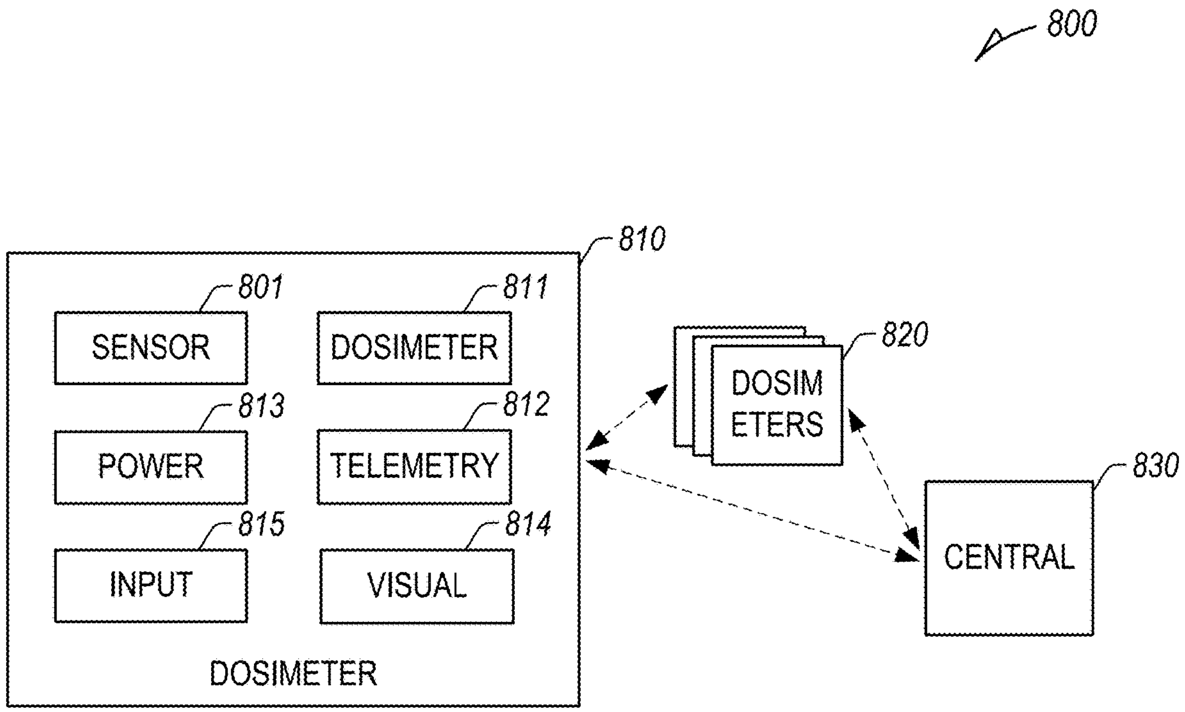
FIG. 8 illustrates an example system including a dosimeter.

FIG. 8 illustrates an example system 800 including a dosimeter 810. The dosimeter 810 can include a blast sensor 801, such as one or more of the previous blast sensors or pressure sensors disclosed and described herein (e.g., the pressure sensor 301 of the blast sensor system 300 of FIG. 3, etc.). and additional components configured to enable the blast sensor 801 to operate as a networked or stand-alone dosimeter device. The dosimeter 810 can include a dosimeter circuit 811 (or one or more other processors or control circuits) configured to receive information from the blast sensor 801 (e.g., a pressure sensor, etc.) and to measure or monitor exposure to time-aggregate impulse noise or shock wave events, determine the magnitude of and count individual events, etc. The dosimeter 810 can include a telemetry circuit 812 configured to provide communication (wired or wireless) into or out of the dosimeter 810 according to one or more communication protocols. In certain examples, the telemetry circuit 812 can be configured for one or both of wired and wireless communication, in certain examples, separately selectable by a user, etc.

In an example, the dosimeter 810 can include a housing (e.g., a wearable housing configured to be worn by a user, a non-wearable housing configured to be fixed to a specific location, etc.) configured to house the blast sensor 801, the dosimeter circuit 811, the telemetry circuit 812, and a power source 813 configured to provide power to the system 800. In certain examples, the dosimeter 810 can include one or more audible or visual indicators 814 configured to provide one or more indications to a user (e.g., lights, speakers, a display screen, etc.), and one or more inputs 815 (e.g., button interfaces, a touch-screen interface, etc.) configured to receive user input, commands, etc. In certain examples, the dosimeter 810 can include one or more elastic cords or other physical attachments to enable secure attachment to the body or one or more other pieces of equipment, etc.

In an example, the power source 813 can include a rechargeable battery. In other examples, the power source 813 can specifically include a non-rechargeable battery configured to provide power for the components of the dosimeter 810 for a substantial time period, such as up to 1-year or more, and the remaining components of the dosimeter 810 can be configured for such long-term use (e.g., wired telemetry, etc.). In an example, the power source 813 can be a replaceable battery, rechargeable or non-rechargeable.

In an example, the dosimeter circuit 811 can include an ADC, or one or more amplifiers, pre-amplifiers, filter circuits, etc., configured to process an attenuated output signal from the blast sensor 801. The dosimeter circuit 811 can be configured to detect and record event information, such as impulse noise or shock wave event signatures in real time. The dosimeter circuit 811 can be configured to distinguish between shock wave (e.g., blast overpressure (BOP)) and other impulse events, such as by using a detected rise time, frequency, event signature, etc., and separately account for such event types, and distinguish separate harms to the user, including between NIHL and TBI, etc. In addition, the dosimeter circuit 811 can be configured to identify and reject mechanical impulse or mechanical shock events, such as due to motion or physical touching or contact of the dosimeter 810, separate from an impulse noise or shock wave events, using signal characteristics, such as rise time, frequency, event signature, etc.

In addition, the dosimeter circuit 811 can be configured to measure or determine exposure to adverse impulse noise or shock wave events over various time periods, such as over a 24-hour period, an 8-hour period, or longer or shorter time periods, to avoid deleterious effects to a user exposed to such adverse events. In an example, using information from the dosimeter circuit 811 or information received from one or more other control circuits or processors, such as through the telemetry circuit 812, the one or more audible or visual indicators 814 can be configured to alert a user that one more harmful exposure levels is approaching or has been exceeded. In other examples, the one or more audible or visual indicators 814 can notify a user that no harmful events or levels have been detected or exceeded.

In certain examples, the dosimeter 810 can include one or more location sensors, such as GPS, cellular, or other location-based sensors. The dosimeter 810 can further include one or more other atmospheric or environmental sensors (e.g., temperature, atmospheric pressure, etc.). In certain examples, the dosimeter circuit 811 can be configured to adjust the measurement or monitoring of impulse noise or shock wave events or exposure using the received atmospheric or environmental information. In certain examples, the dosimeter circuit 811 can include a clock and can be configured to store a log of timestamped events, such as having SPLs above a certain level, specific signatures, etc.

In an example, the system 800 can include one or more additional dosimeters 820, including one or more components illustrated in the dosimeter 810, additional sensors, etc., or one or more additional stationary housings, sensors, or sensor systems. The system 800 can further include a central processing device 830 including one or more circuits or processors configured to provide information to or receive information from one or multiple sensors, such as one or more sensors associated with a single user, sensors associated with multiple users, one or more stationary sensors, or combinations thereof. The central processing device 830 can store information from the dosimeter 810 or the one or more additional dosimeters 820 or stationary housings, sensors, or sensor systems. In an example, the central processing device 830 can include a portable or non-portable computer hub, such as a tablet or a personal computer, configured to collect data from one or more sensors, dosimeters, etc., and store information for analysis, such as with respect to one or more sensors, dosimeters, users, groups of users, geographic area, etc., in a database.

Figure 9:
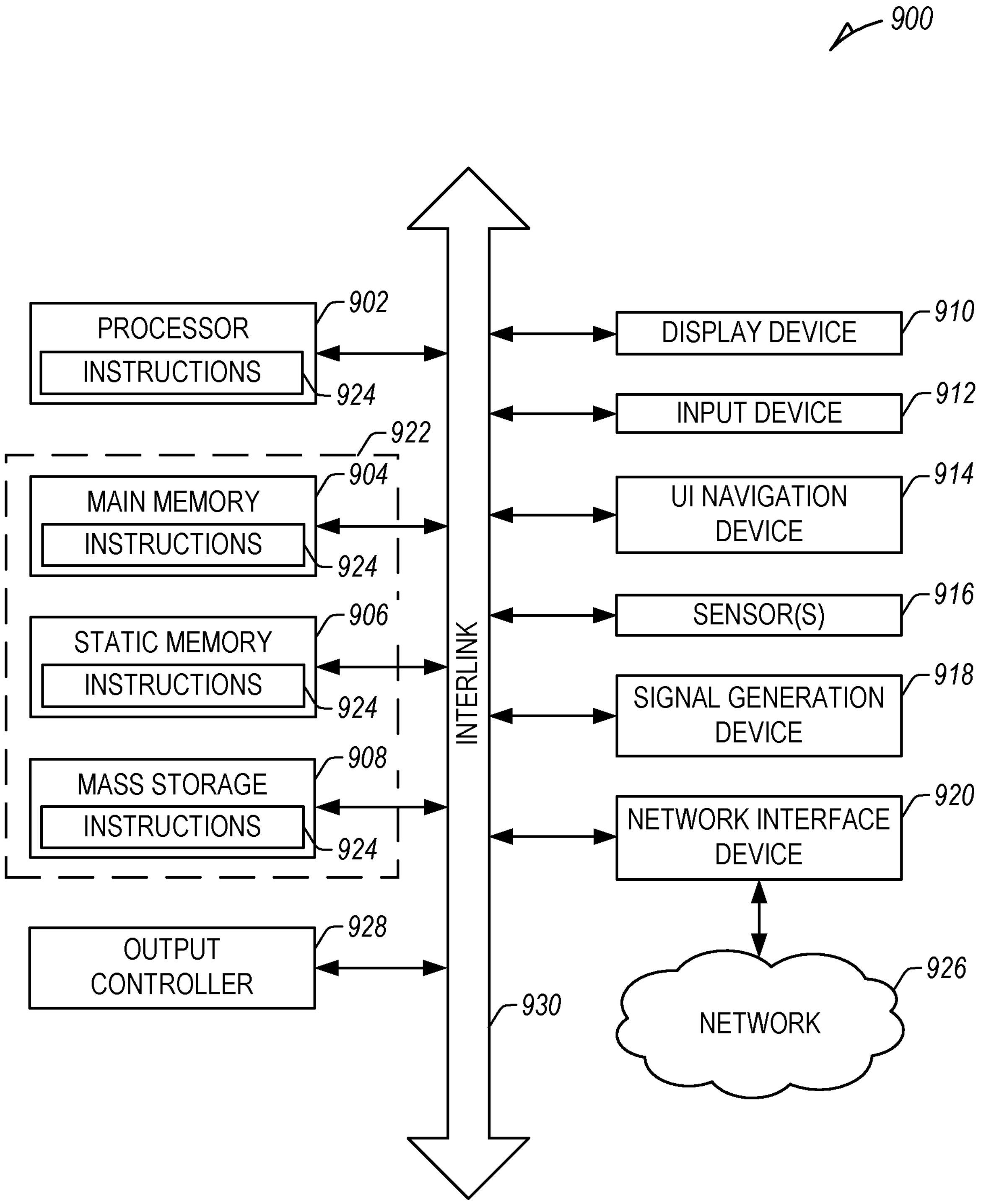
FIG. 9 illustrates a block diagram of an example machine upon which any one or more of the techniques (e.g., methodologies) discussed herein may perform.

FIG. 9 illustrates a block diagram of an example machine 900 upon which any one or more of the techniques (e.g., methodologies) discussed herein may perform. Portions of this description may apply to the computing framework of one or more of the dosimeters, circuits, or processors described herein. Examples, as described herein, may include, or may operate by, logic or a number of components, or mechanisms in the machine 900. Circuitry (e.g., processing circuitry, a dosimeter circuit, etc.) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912, and UI navigation device 914 may be a touch screen display. The machine 900 may additionally include a signal generation device 918 (e.g., a speaker), a network interface device 920, and one or more sensors 916, such as a global positioning system (GPS) sensor, compass, accelerometer, or one or more other sensors. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine-readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine-readable medium 922. While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900, and includes digital or analog communications signals or other intangible medium to facilitate communication of such software. A transmission medium is a machine-readable medium.

Various embodiments are illustrated in the figures above. One or more features from one or more of these embodiments may be combined to form other embodiments. Method examples described herein can be machine or computer-implemented at least in part. Some examples may include a computer-readable medium or machine-readable medium encoded with instructions operable to configure an electronic device or system to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times.

Example 1 is a system for detecting impulse noise or shock wave events, comprising: a housing comprising an upper surface and an interior; a blast sensor proximate the upper surface of the housing; and a light attenuation material covering at least a portion of an upper surface of the blast sensor, the light attenuation material comprising a pigmented gel.

In Example 2, the subject matter of Example 1 includes, wherein the blast sensor is located at the upper surface of the housing.

In Example 3, the subject matter of Examples 1-2 includes, wherein the upper surface of the housing defines an opening, wherein the upper surface of the blast sensor faces the opening of the upper surface of the housing.

In Example 4, the subject matter of Examples 1-3 includes, a mesh material covering the opening of the upper surface of the housing.

In Example 5, the subject matter of Examples 1-4 includes, wherein the blast sensor is configured to detect impulse noise or shock wave events, and wherein the light attenuation material is configured to reduce light transmission to the blast sensor to reduce false detection of impulse noise or shock wave events from changes in light by the blast sensor.

In Example 6, the subject matter of Example 5 includes, wherein the blast sensor comprises a microelectromechanical systems (MEMs) pressure sensor configured to receive mechanical pressure changes and provide an electrical output representative of the received mechanical pressure changes.

In Example 7, the subject matter of Examples 5-6 includes, wherein the blast sensor comprises a sensing element proximate an opening in the upper surface of the blast sensor, wherein the light attenuation material comprises a thickness between 0.1 mm and 2 mm over the sensing element.

In Example 8, the subject matter of Example 7 includes, wherein the light attenuation material is a mixture of gel and pigment, wherein the concentrations of the pigment in the gel is a function of the thickness over the sensing element to achieve the desired optical density.

In Example 9, the subject matter of Example 8 includes, wherein the pigment includes carbon or copper chromite.

In Example 10, the subject matter of Examples 8-10 includes, wherein the light attenuation material comprises one of: a thickness of 0.25 mm over the sensing element and a concentration of 40 parts gel to 6 parts pigment In Example 11, the subject matter of Examples 8-10 includes, wherein the light attenuation material comprises one of: a thickness of 0.25 mm over the sensing element and a concentration of 40 parts gel to 6 parts pigment; a thickness of 0.125 mm over the sensing element and a concentration of 40 parts gel to 12 parts pigment; or a thickness of 0.5 mm over the sensing element and a concentration of 40 parts gel to 3 parts pigment.

In Example 12, the subject matter of Examples 5-11 includes, wherein the light attenuation material comprises one of: a thickness of approximately 0.25 mm over the sensing element and a concentration of 40 parts gel to 5 to 7 parts pigment; a thickness of approximately 0.125 mm over the sensing element and a concentration of 40 parts gel to 10 to 12 parts pigment; or a thickness of approximately 0.5 mm over the sensing element and a concentration of 40 parts gel to 3 to 5 parts pigment.

Example 13 is a system for detecting impulse noise or shock wave events, comprising: a blast sensor comprising a sensing element configured to detect impulse noise or shock wave events; and a light attenuation material over at least a portion of the blast sensor configured to reduce light transmission to the sensing element to reduce false detection of impulse noise or shock wave events from changes in light by the sensing element of the blast sensor, the light attenuation material comprising a pigmented gel having a thickness between 0.1 mm and 1 mm over the sensing element and a concentration of 40 parts gel to 2 to 14 parts pigment.

In Example 14, the subject matter of Example 13 includes, a housing comprising an upper surface and an interior, wherein the blast sensor is located proximate the upper surface of the housing wherein the upper surface of the housing defines an opening, wherein the upper surface of the blast sensor faces the opening of the upper surface of the housing.

In Example 15, the subject matter of Examples 13-14 includes, a mesh material covering the opening of the upper surface of the housing, wherein the blast sensor comprises a microelectromechanical systems (MEMs) pressure sensor configured to receive mechanical pressure changes and provide an electrical output representative of the received mechanical pressure changes.

In Example 16, the subject matter of Example 15 includes, wherein the blast sensor comprises a sensing element proximate an opening in the upper surface of the blast sensor, and wherein the pigment includes a carbon or copper chromite pigment.

In Example 17, the subject matter of Examples 15-16 includes, wherein the light attenuation material comprises one of: a thickness of approximately 0.25 mm over the sensing element and a concentration of 40 parts gel to 5 to 7 parts pigment; a thickness of approximately 0.125 mm over the sensing element and a concentration of 40 parts gel to 10 to 14 parts pigment; or a thickness of approximately 0.5 mm over the sensing element and a concentration of 40 parts gel to 2 to 5 parts pigment.

Example 18 is a method for detecting impulse noise or shock wave events, comprising: sensing impulse noise or shock wave events using a blast sensor proximate an upper surface of a housing comprising an upper surface and an interior; and reducing light transmission to a sensing element of the blast sensor using a light attenuation material over at least a portion of the blast sensor, the light attenuation material comprising a pigmented gel.

In Example 19, the subject matter of Example 18 includes, wherein the light attenuation material comprising a pigmented gel having a thickness between 0.1 mm and 1 mm over the sensing element and a concentration of 40 parts gel to 6 parts pigment.

In Example 20, the subject matter of Examples 18-19 includes, wherein the light attenuation material comprises one of: a thickness of approximately 0.25 mm over the sensing element and a concentration of 40 parts gel to 5 to 7 parts pigment; a thickness of approximately 0.125 mm over the sensing element and a concentration of 40 parts gel to 10 to 14 parts pigment; or a thickness of approximately 0.5 mm over the sensing element and a concentration of 40 parts gel to 2 to 5 parts pigment.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description is intended to be illustrative, and not restrictive. The scope of the disclosure should, therefore, be determined with references to the appended claims, along with the full scope of equivalents to which such claims are entitled.

What is claimed is:

1. A system for detecting impulse noise or shock wave events, comprising:

a housing comprising an upper surface and an interior;

a blast sensor proximate the upper surface of the housing; and a light attenuation material covering at least a portion of an upper surface of the blast sensor, the light attenuation material comprising a pigmented gel.

2. The system of claim 1, wherein the blast sensor is located at the upper surface of the housing.

3. The system of claim 1, wherein the upper surface of the housing defines an opening, wherein the upper surface of the blast sensor faces the opening of the upper surface of the housing.

4. The system of claim 3, comprising:

a mesh material covering the opening of the upper surface of the housing.

5. The system of claim 1, wherein the blast sensor is configured to detect impulse noise or shock wave events, and wherein the light attenuation material is configured to reduce light transmission to the blast sensor to reduce false detection of impulse noise or shock wave events from changes in light by the blast sensor.

6. The system of claim 5, wherein the blast sensor comprises a microelectromechanical systems (MEMs) pressure sensor configured to receive mechanical pressure changes and provide an electrical output representative of the received mechanical pressure changes.

7. The system of claim 5, wherein the blast sensor comprises a sensing element proximate an opening in the upper surface of the blast sensor, and wherein the light attenuation material comprises a thickness between 0.1 mm and 2 mm over the sensing element.

8. The system of claim 7, wherein the light attenuation material is a mixture of gel and pigment, wherein a required minimum concentration of the pigment in the gel is a function of the thickness over the sensing element.

9. The system of claim 8, wherein the pigment includes a carbon or copper chromite particle.

10. The system of claim 8, wherein the light attenuation material comprises a thickness of 0.25 mm over the sensing element and a concentration of 40 parts gel to 6 parts pigment.

11. The system of claim 8, wherein the light attenuation material comprises one of:

a thickness of 0.125 mm over the sensing element and a concentration of 40 parts gel to 12 parts pigment; or a thickness of 0.5 mm over the sensing element and a concentration of 40 parts gel to 3 parts pigment.

12. The system of claim 7, wherein the light attenuation material comprises one of:

a thickness of approximately 0.25 mm over the sensing element and a concentration of 40 parts gel to 5 to 7 parts pigment;

a thickness of approximately 0.125 mm over the sensing element and a concentration of 40 parts gel to 10 to 14 parts pigment; or a thickness of approximately 0.5 mm over the sensing element and a concentration of 40 parts gel to 2 to 5 parts pigment.

13. A system for detecting impulse noise or shock wave events, comprising:

a blast sensor comprising a sensing element configured to detect impulse noise or shock wave events; and a light attenuation material over at least a portion of the blast sensor configured to reduce light transmission to the sensing element to reduce false detection of impulse noise or shock wave events from changes in light by the sensing element of the blast sensor, the light attenuation material comprising a pigmented gel having a thickness between 0.1 mm and 1 mm over the sensing element and a concentration of 40 parts gel to 2 to 14 parts pigment.

14. The system of claim 13, comprising:

a housing comprising an upper surface and an interior, wherein the blast sensor is located proximate the upper surface of the housing wherein the upper surface of the housing defines an opening, and wherein an upper surface of the blast sensor faces the opening of the upper surface of the housing.

15. The system of claim 14, comprising:

a mesh material covering the opening of the upper surface of the housing, wherein the blast sensor comprises a microelectromechanical systems (MEMs) pressure sensor configured to receive mechanical pressure changes and provide an electrical output representative of the received mechanical pressure changes.

16. The system of claim 15, wherein the blast sensor comprises a sensing element proximate an opening in the upper surface of the blast sensor, and wherein the pigment includes a carbon or copper chromite pigment.

17. The system of claim 15, wherein the light attenuation material comprises one of:

a thickness of approximately 0.25 mm over the sensing element and a concentration of 40 parts gel to 5 to 7 parts pigment;

a thickness of approximately 0.125 mm over the sensing element and a concentration of 40 parts gel to 10 to 14 parts pigment; or a thickness of approximately 0.5 mm over the sensing element and a concentration of 40 parts gel to 2 to 5 parts pigment.

18. A method for detecting impulse noise or shock wave events, comprising:

sensing impulse noise or shock wave events using a blast sensor proximate an upper surface of a housing comprising an upper surface and an interior; and reducing light transmission to a sensing element of the blast sensor using a light attenuation material over at least a portion of the blast sensor, the light attenuation material comprising a pigmented gel.

19. The method of claim 18, wherein the light attenuation material comprises a thickness between 0.1 mm and 1 mm over the sensing element and a concentration of 40 parts gel to 6 parts pigment.

20. The method of claim 18, wherein the light attenuation material comprises one of:

a thickness of approximately 0.25 mm over the sensing element and a concentration of 40 parts gel to 5 to 7 parts pigment;

a thickness of approximately 0.125 mm over the sensing element and a concentration of 40 parts gel to 10 to 14 parts pigment; or a thickness of approximately 0.5 mm over the sensing element and a concentration of 40 parts gel to 2 to 5 parts pigment.

* * * * *